April 14, 1959 J. R. BAUMGARTNER 2,882,047
CARTON BLANK DELIVERY MECHANISM
Filed June 6, 1957 5 Sheets-Sheet 1
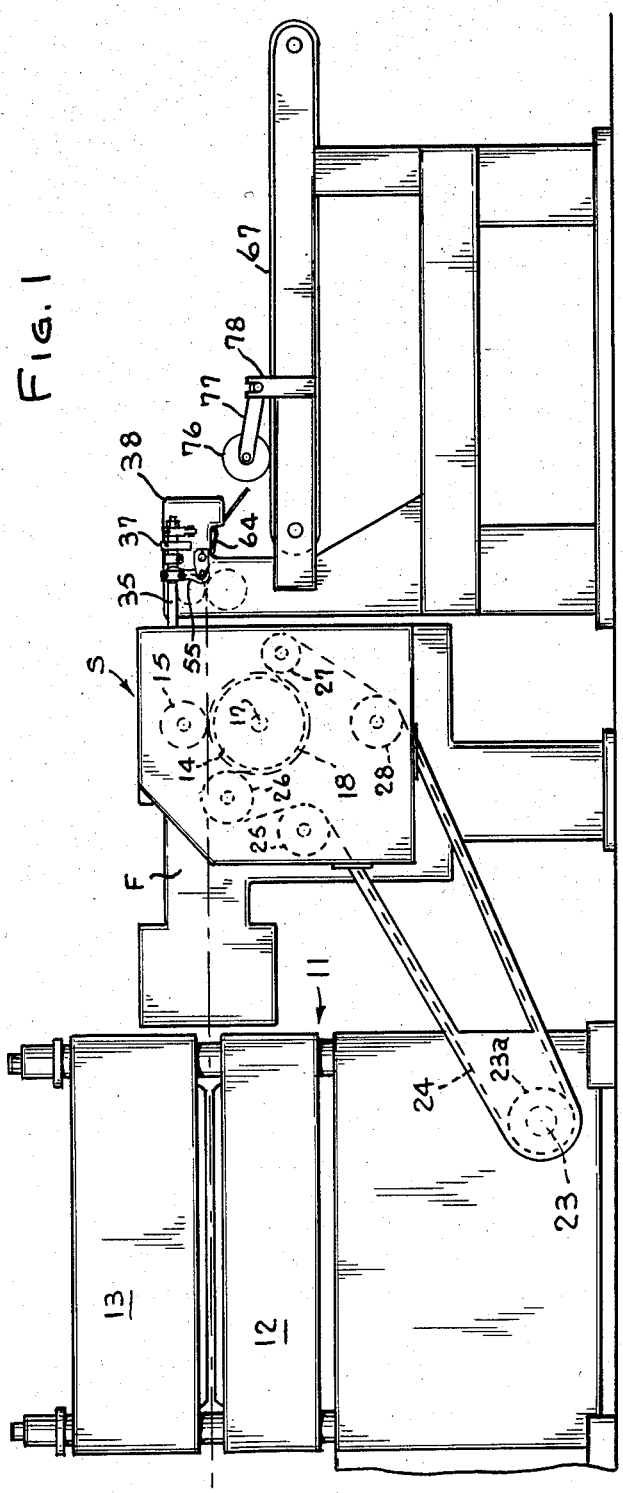
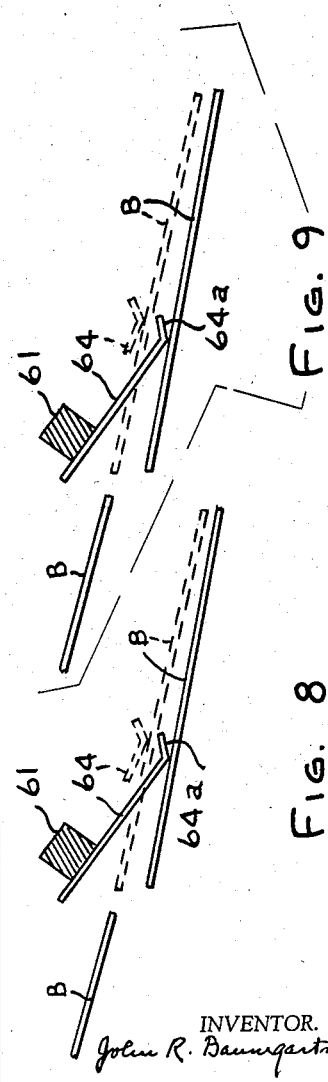
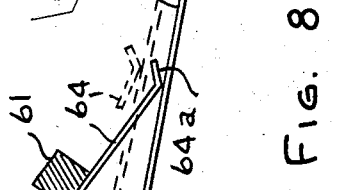
INVENTOR.
John R. Baumgartner
BY
Charles F. French
Attys.

April 14, 1959 J. R. BAUMGARTNER 2,882,047
CARTON BLANK DELIVERY MECHANISM
Filed June 6, 1957 5 Sheets-Sheet 3

INVENTOR.
John R. Baumgartner
BY Charles J. French
Att'ys.

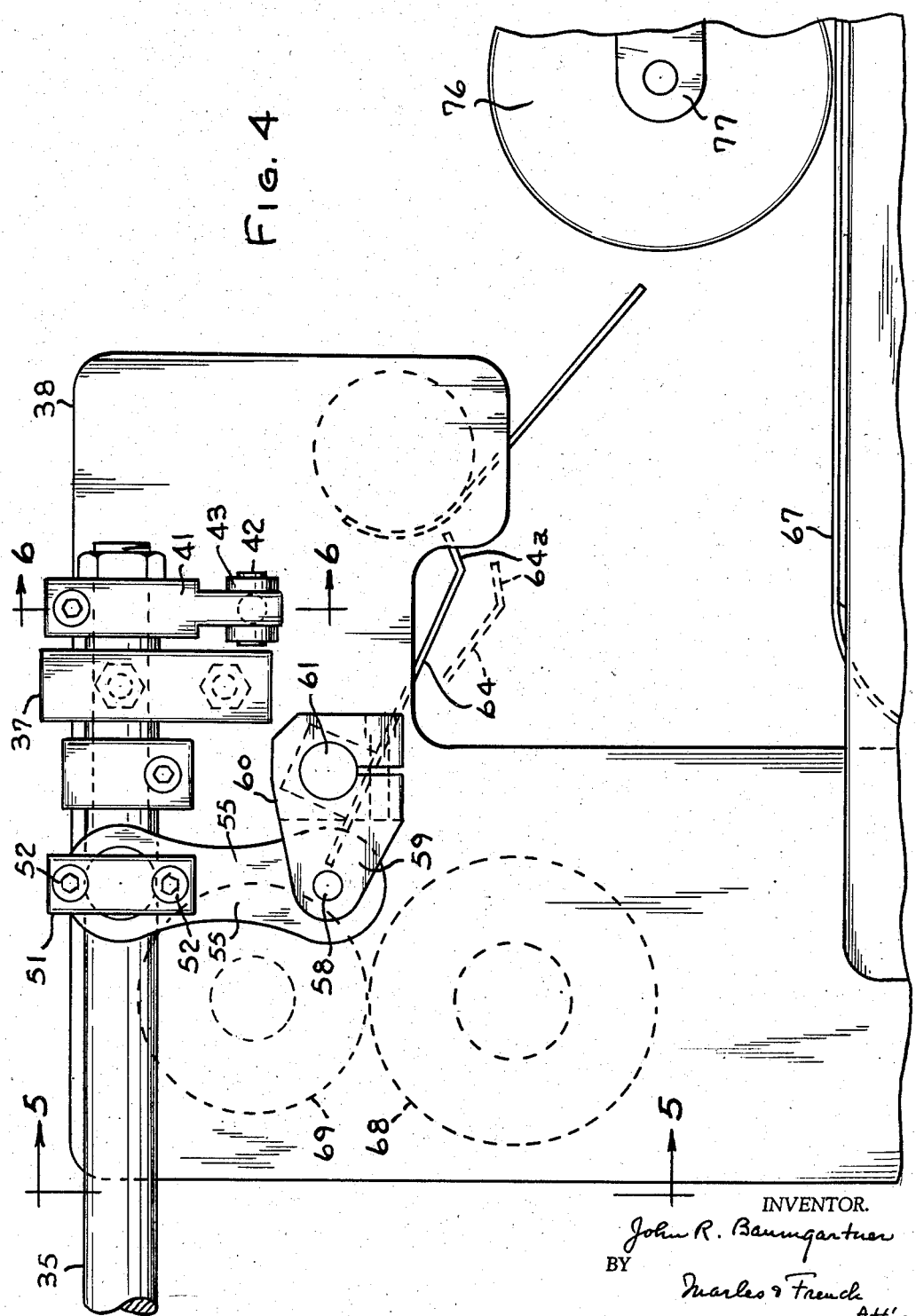

April 14, 1959     J. R. BAUMGARTNER     2,882,047
CARTON BLANK DELIVERY MECHANISM
Filed June 6, 1957     5 Sheets-Sheet 5
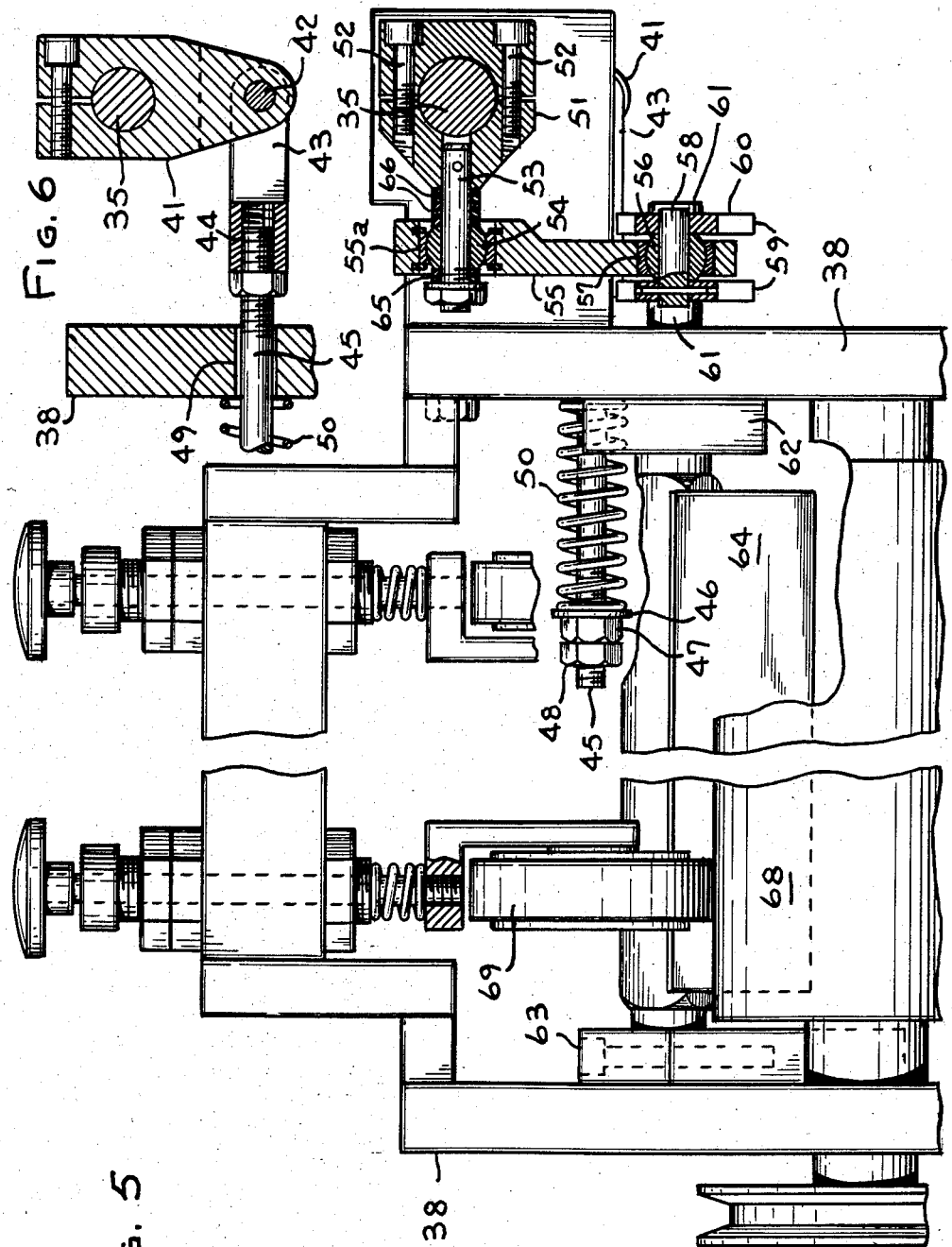

United States Patent Office 2,882,047
Patented Apr. 14, 1959

2,882,047

CARTON BLANK DELIVERY MECHANISM

John R. Baumgartner, Milwaukee, Wis.

Application June 6, 1957, Serial No. 663,940

4 Claims. (Cl. 271—7)

The invention relates to carton or box blank forming apparatus and more particularly to the blank delivery mechanism of such apparatus.

In carton or box blank forming apparatus of the type shown, for example, in my U.S. Patent No. 2,655,842, dated October 20, 1953, where a series of multiple blanks are formed in one operation of the blanking press lengthwise of the web, the full speed capabilities of the press cannot be realized because at the higher press speeds the lengthwise disposed finished multiple blanks may interfere with each other as they are delivered to the delivery conveyor, and as a result the rate of production of the machine has been limited. The object of the present invention is to incorporate in the delivery mechanism of the apparatus timed mechanism operable as the blanks from a single operation of the press are delivered to deflect successive blanks downwardly away from following blanks as they fall onto the delivery conveyor and thereby permit a material increase in the speed of the press.

The invention further consists in the several features hereinafter described and more particularly defined by claims at the conclusion hereof.

In the drawings:

Fig. 1 is a diagrammatic view of the press, stripper mechanism, and delivery mechanism of a carton blank forming apparatus including features embodying the invention;

Fig. 4 is an enlarged and detailed view of parts of the apparatus shown in Fig. 1;

Fig. 5 is a view taken along the line 5—5 of Fig. 4 with other parts shown in section;

Fig. 6 is a detailed vertical sectional view taken on the line 6—6 of Fig. 4;

Figs. 8 and 9 are diagrammatic views, showing successive actions on three blanks as they pass to the delivery conveyor.

Figure 3:
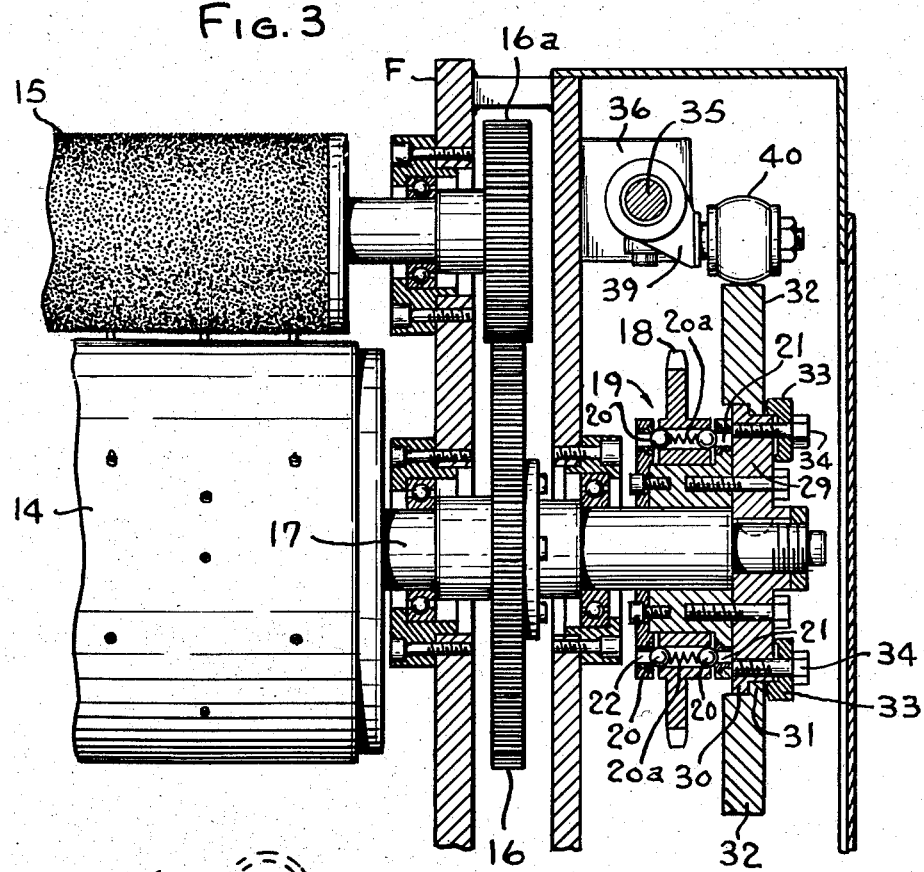
Fig. 3 is a detailed vertical sectional view taken on the line 3—3 of Fig. 2.
Figure 7:
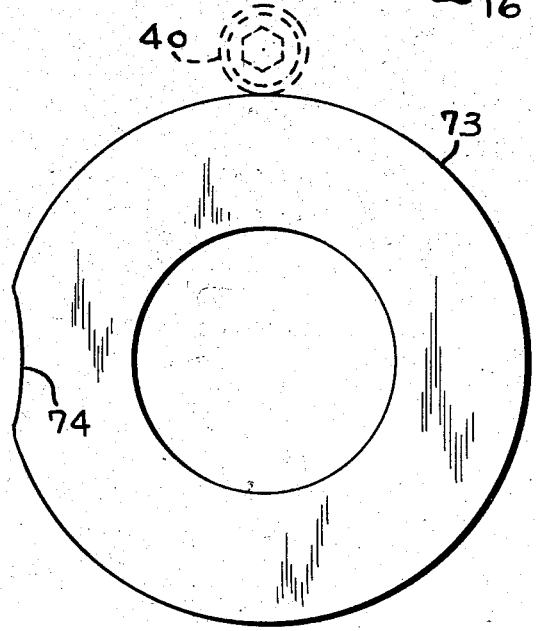
Fig. 7 is a plan view of a cam for a two piece blank.

Referring to Fig. 1, the numeral 11 designates a blanking press including a fixed platen 12 and a movable platen 13, one such press being shown in detail in my previously mentioned patent and S designates generally any suitable waste stripping mechanism, that indicated herein being similar to the mechanism shown and described in detail in my copending application Serial No. 484,480, filed January 27, 1955, for Blank Forming Apparatus, and including as indicated in Fig. 3 a pin carrying roll 14 and its cooperative brush roll 15, said rolls being journalled in the side members of a frame F and connected together by gears 16 and 16a on the shafts for said rolls, as shown in Fig. 3, the extension of the shaft 17 for the roll 14 has a sprocket wheel 18 mounted thereon through a safety clutch type connection 19 which includes drive balls 20 loaded by springs 20a and working in bores in the gear against collars 21 and 22 secured together and to a plate 29 to rotate with the shaft, the spring loading of the balls permitting the gear to slip under excessive overloads.

Figure 2:
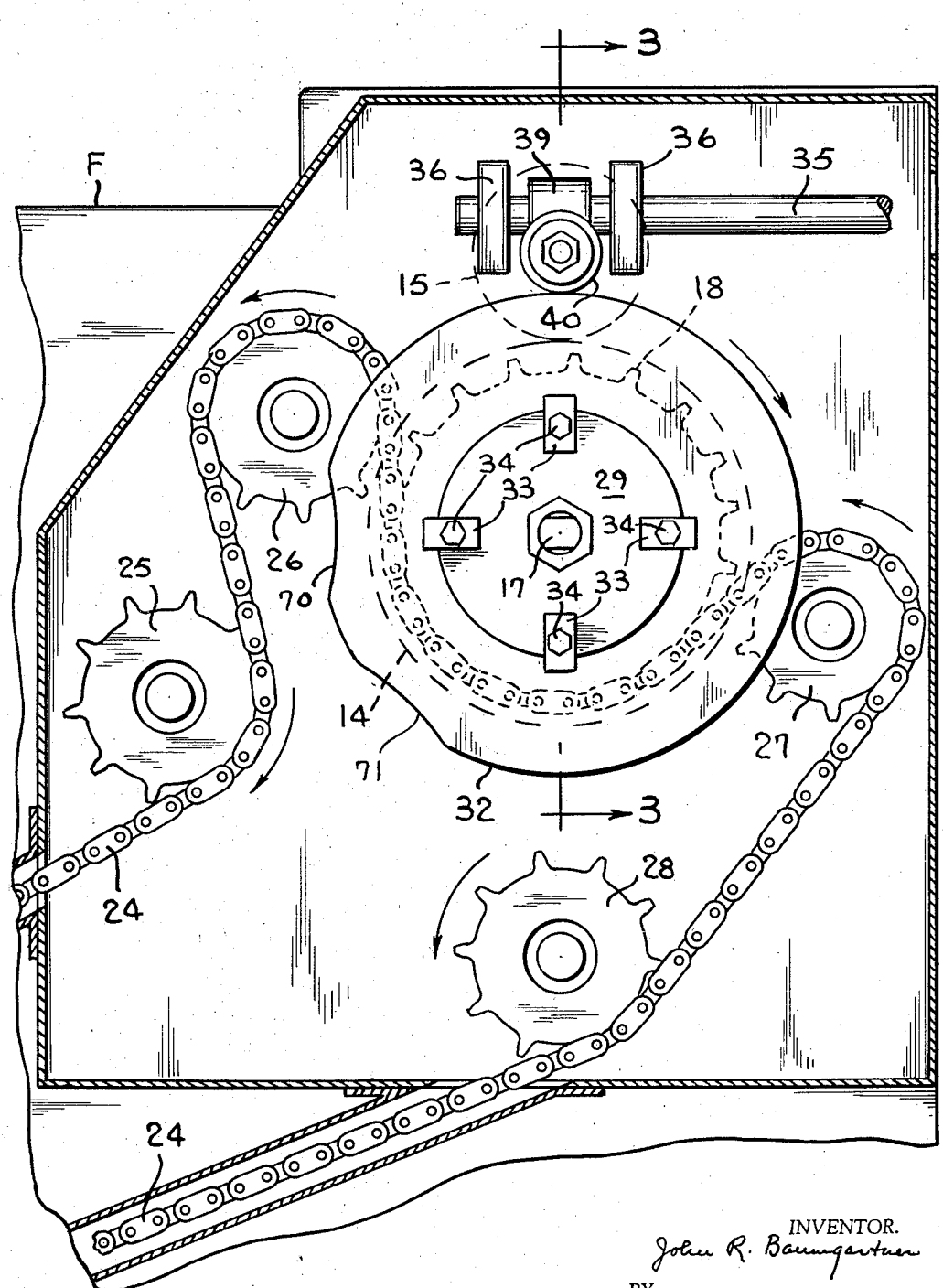
Fig. 2 is an enlarged detailed view of parts of the apparatus shown in Fig. 1 with parts broken away.

Referring to Figs. 1 and 2, the press has a power take off shaft 23 carrying a sprocket 23a connected by a chain 24 with the sprocket 18 and auxiliary sprockets 25, 26, 27, and 28 whereby the shaft 17 is driven in timed relation with the operation of the press.

Referring to Figs. 2 and 3, a circular plate 29 is keyed to the shaft 17 and has a peripheral flanged portion 30 against which the mating flanged portion 31 of a cam 32 is adapted to be clamped in any desired position of angular adjustment by a series of radially disposed clamping blocks 33 and bolts 34 anchored in the plate 29.

A longitudinally disposed shaft 35 is journalled in brackets 36 on the stripper section and a bearing 37 on the frame 38 of the delivery section and as shown in Fig. 3 carries an arm 39 provided with a roller 40 riding on the cam 32 so that the shaft 35 is oscillated as determined by the contour of said cam.

Referring to Figs. 4 and 6, the outer end of the shaft 35 carries an arm or crank 41 pivotally connected at its outer end by a pin 42 to a two piece rod including a portion having a forked end 43 and a threaded bore 44 receiving the threaded end of the other rod portion 45 which carries a washer 46 and nuts 47 and 48. Rod portion 45 passes through an opening 49 in frame 38 and has a spring 50 mounted thereon between said washer 46 and the frame and loaded by the nuts 47 and 48 to act through said arm 41 on the shaft 35 normally tending to oscillate said shaft in a direction to swing said arm 39 downwardly to maintain the roller 40 in contact with cam 32.

Referring to Figs. 4 and 5, the shaft has a two part collar 51 clamped thereto by bolts 52 and carrying a pin shaped arm 53 carrying a swivel type bearing member 54 engaging a bearing member 55a mounted in one end of a link or arm 55 whose other end has a similar swivel bearing connection 56, 57 to that just described with a pin 58 mounted in spaced arms 59 of a crank 60 carried by the outer end of an oscillatory shaft 61 journalled in bearings 62 and 63 on the machine frame and carrying a blank pusher plate 64 having an upturned end 64a.

As shown in Fig. 5, the bearing member 54 is mounted between opposite sets of spacing washers 65 and 66 so that by varying the number of washers of each set relative to the other the bearing 54 may be adjusted laterally and thus vary the effective length of the pin arm 53 to vary the effective throw of the link 55 and consequently the angular movement of the shaft 61 and the plate 64.

The plate 64 extends transversely of the frame, and its inner end is disposed adjacent the feed mechanism for delivering the blanks from the stripper mechanism to an endless delivery belt 67 mounted on the usual rollers and one of which is driven as in the Patent No. 2,655,842, previously noted. The plate 64 is suspended between the feed mechanism and the belt 67.

The portion of the feed mechanism shown is that of my copending application Serial No. 586,984, filed May 24, 1956, for Carton Blank Feeding Mechanism, and includes a single lower roller belt driven roller 68 and a series of skewable individually adjustable spring urged rollers 69 by which a series of laterally disposed blanks are separated from each other before passing to the delivery belt 67. For example, the blanking press may blank out in one operation a plurality of laterally spaced blanks, and the blank or blanks in each row of these blanks are separated as they are delivered to belt 67. In the present construction the blanks of each row of blanks as they leave the feed mechanism including the roll 68 pass forwardly beneath the pusher plate 64 when in its idle or inoperative position and are projected outwardly to fall upon the delivery belt and be carried along thereby. Without the pusher plate mechanism it has been found that successive multiple blanks in a row will frequently catch on each other unless the speed of the press is reduced well below its rated capacity.

With the above described construction, the plate 64 is held in its upper position by the roller 40 held against the high part of the cam 32 by the spring 50 acting through rod 45, 43, crank 41, shaft 35, collar 51, arm 53, link 55, and crank 60. As the back end portion of a finished blank B is delivered by the feed rolls 68 and 69 to the delivery belt 67, the roller 40 under the action of the spring actuated parts above described is moved down into one of the depressions 70, 71 of the cam 32. When, as the blank is dropping down onto the belt 67, the roller 40 does so move, its crank arm 39 is swung down and the shaft 35 is swung clockwise causing the crank 53 to pull up on the link 55 and through the crank 60 swing the shaft 61 clockwise and thus swing the plate 64 down so that it strikes and pushes the rear end portion of the blank down, this action being shown for successive blanks B as they are delivered to the belt 67 wherein Fig. 8 shows the pusher plate 68 acting on the first blank B and Fig. 9 said pusher plate acting on the second blank B, it being noted that the last blank is not operated on by the plate 68 as there is a sufficient time interval before the next set of blanks are delivered from the press to let this last blank fall freely. In case there are only two blanks in a row, then the pusher control cam 73 has only one depression 74 similar to the depression 70. The positively actuated pusher plate 64 ensures that a preceding blank will be out of the way of the advancing end of a succeeding blank as the first blank drops onto the delivery conveyor.

With a freely falling blank, the pressure of the air on the blank as it falls tends to retard its dropping, and by the positive forcing down of the rear end portion of the blank, the air pressure effect on the blank is overcome or minimized. As a result of the above construction, the press may now be run at its full rated speed without danger of successive blanks interfering with each other, and in practice this means a considerable increase in the rate of movement of the web through the apparatus and hence an increase in the production rate.

A gravity actuated lay-down roller 76 mounted on arms 77 pivotally mounted at 78 on the delivery frame extends transversely of the belt 67 and is adapted to ride on the tops of the blanks delivered to the delivery conveyor.

A deflector plate 79 may also be fixedly mounted on the frame 38 in front of the plate 64 as indicated in Figs. 1 and 4 to insure downward deflection of the front ends of all blanks toward the conveyor 67 on their passage from said feed rolls 68 and 69.

I desire it to be understood that this invention is not to be limited to any particular form or construction of parts except insofar as such limitations are included in the appended claims.

What I claim as my invention is:

1. In the delivery mechanism of a blank forming apparatus, the combination with a movable delivery conveyor, and feed means for delivering a series of successive finished blanks to said conveyor, of movable means for pushing down the tail end portion of a blank as it passes from said feed means to said conveyor to prevent its interference with a following blank, and means for positively moving said movable means intermittently as determined by the number of successive blanks delivered by said feed means.

2. In the delivery mechanism of a carton blank forming apparatus having a press adapted to form a plurality of blanks lengthwise of the stock during a single operation of the press, the combination with a movable delivery conveyor and feed means for delivering from a single press operation successive finished blanks to said conveyor, of a swingable pusher plate suspended between said feed means and said conveyor for pushing down the tail end portion of a blank as it passes from said feed means to said conveyor to prevent its interference with a following blank, and means, positively timed relative to press operation, for positively operating said plate.

3. In the delivery mechanism of a carton blank forming apparatus having a press adapted to form a plurality of blanks lengthwise of the stock during a single operation of the press, the combination with a movable delivery conveyor and feed means for delivering from a single press operation successive finished blanks to said conveyor, of a swingable pusher plate suspended between the feed means and said conveyor for pushing down the tail end portion of a blank as it passes from said feed means to said conveyor to prevent its interference with a following blank, a press timed rotary control cam, and motion transmitting mechanism between said cam and plate for positively operating said plate.

4. Delivery mechanism as defined in claim 3, wherein the motion transmitting means includes an oscillatory shaft having a crank arm, spring means for urging said crank arm into engagement with said cam, a second crank arm on said shaft, an oscillatory shaft for carrying said plate and provided with a crank arm, and a link connection between said last named crank arm and said second named crank arm.

References Cited in the file of this patent

UNITED STATES PATENTS

| | | |
|---|---|---|
| 2,094,664 | Mudd | Oct. 5, 1937 |
| 2,234,263 | Lake et al. | Mar. 11, 1941 |
| 2,753,184 | Backhouse | July 3, 1956 |